Feb. 14, 1950  S. SODERBERG  2,497,475
AIR PILOT
Filed July 9, 1946  2 Sheets-Sheet 1
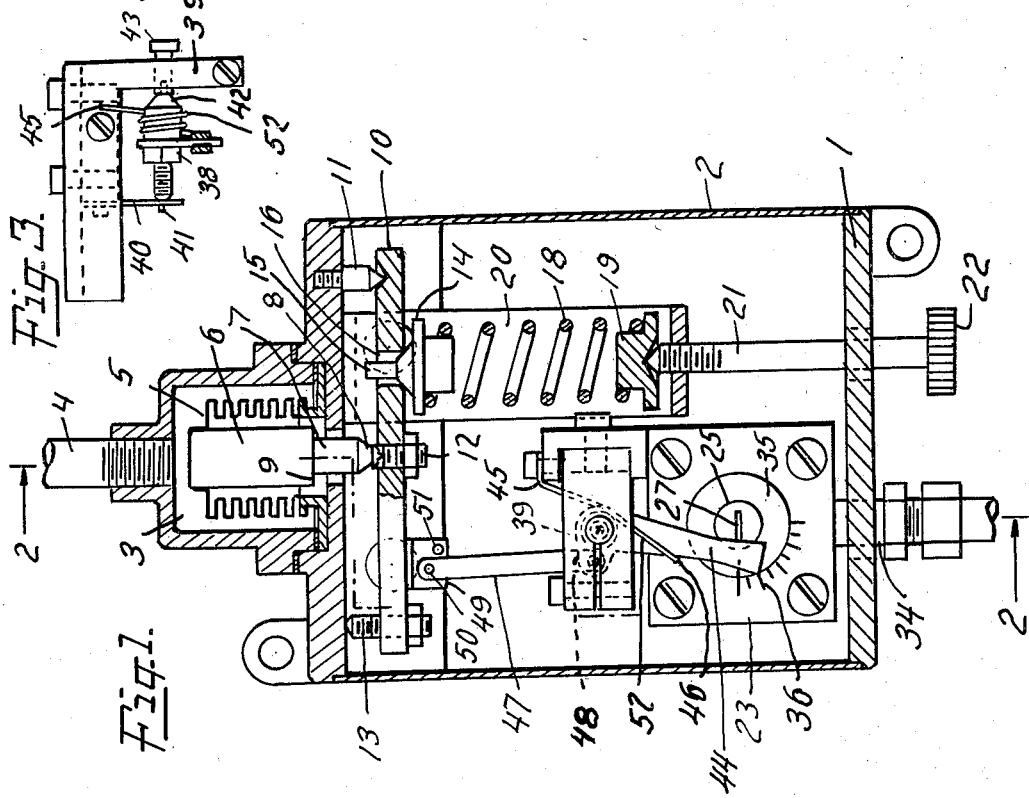
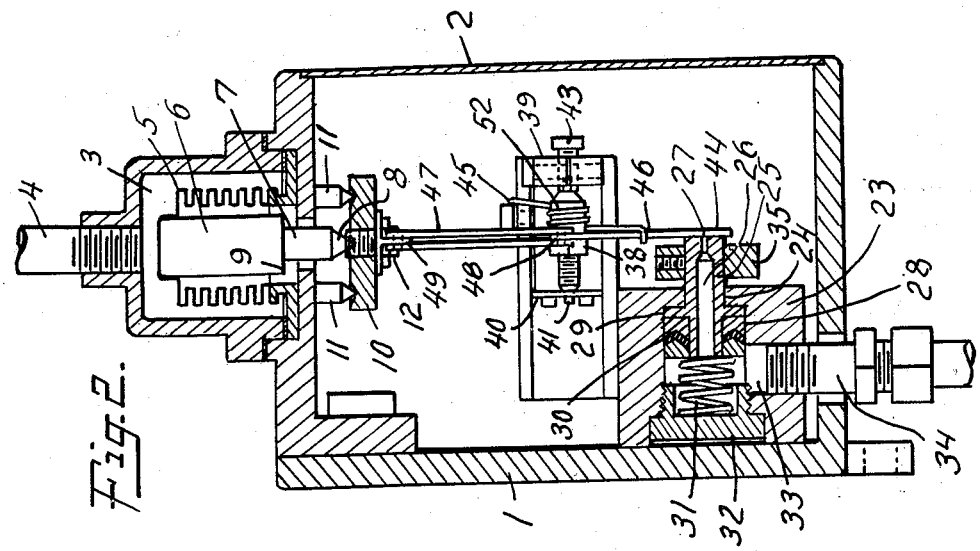
INVENTOR
STEN SODERBERG
BY
Pennie, Edmunds, Morton & Barrows
ATTORNEYS Feb. 14, 1950  S. SODERBERG  2,497,475
AIR PILOT
Filed July 9, 1946  2 Sheets-Sheet 2

INVENTOR
STEN SODERBERG
BY
Pennie, Edmonds, Morton & Barrows
ATTORNEYS

Patented Feb. 14, 1950

2,497,475

UNITED STATES PATENT OFFICE 2,497,475

AIR PILOT

Sten Soderberg, Nutley, N. J., assignor to Leslie Co., Lyndhurst, N. J., a corporation of New Jersey Application July 9, 1946, Serial No. 682,397

5 Claims. (Cl. 137—153)

This invention relates to valves and more particularly to a regulating means for controlling the sensitivity of a valve member.

While the invention is capable of various uses, it will be described in connection with a pilot device in systems to control pressure, volume, temperature or rate of flow of a fluid.

In such systems the flow of fluid in the main line may be controlled by a diaphragm operated valve. A source of air or gas is connected to the diaphragm chamber, generally through a pipe having a restriction to flow therein. The pilot valve is in turn connected to the last mentioned pipe and by regulating the discharge orifice of the pilot valve, the pressure in the diayhragm chamber is controlled.

The place or thing to be controlled, such as the temperature of an enclosure, pressure in a system, etc., actuates a member, such as a bellows, Bourdon tube, diaphragm or the like, to operate a flapper element arranged over the discharge orifice and thus control the pressure in the diaphragm chamber of the main valve by the amount of discharge through the orifice.

While for any given discharge orifice the rate of discharge will depend directly upon the movement of position of the flapper element, a further regulation is desirable to control the sensitivity of the system. Thus, under some conditions a rise or fall of a few pounds of pressure or degrees of temperature may call for a complete opening or closing of the main valve whereas under other conditions, a more gradual opening or closing, i. e., throttling, of the valve may be desired.

The present invention relates to an improved arrangement of the discharge orifice whereby the sensitivity can be regulated. In carrying out the invention I provide a rotatably mounted tube having a discharge orifice at its end whose major axis is much greater than its minor axis. Adjacent the end of the opening I provide a pivotally mounted, wiping arm or lever which is adapted to assume positions closing or partially closing the discharge orifice and thus regulate or control the pressure in the diaphragm chamber of the valve. When the tube is arranged in a position that the path of movement of the wiping lever is across the major axis of the opening, it will be apparent that the lever must move through this longer distance to move from a completely opened to a completely closed position and that any less movement merely results in a partial opening or partial closing of the discharge orifice. On the other hand, if the tube is rotated 90° so that the path of movement of the wiping lever is in the line of the minor axis of the discharge orifice, a very slight movement results in a complete opening or complete closing of the discharge orifice. Intermediate degrees of sensitivity may be obtained by adjusting the tube to intermediate positions between these two 90° limits.

In the accompanying drawing, I have shown one embodiment of the invention. In this showing:

Fig. 1 is a vertical, sectional view, parts being shown in section:

Fig. 2 is a transverse, vertical, sectional view on line 2—2 of Fig. 1;

Fig. 3 is a detailed view of the support for the wiping lever;

Figure 4:
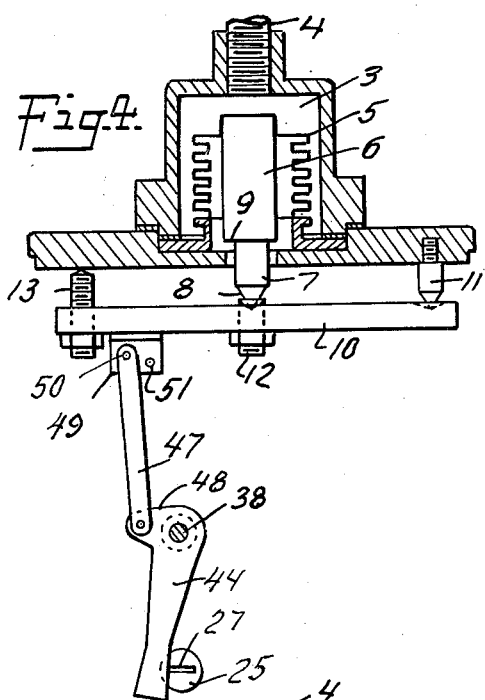
Fig. 4 is a diagrammatic view with the wiping arm or lever in position of open discharge orifice and arranged to be closed upon increase in pressure in the system.

Referring to the drawings, the control mechanism is mounted in a suitable casing 1 having a removable cover 2 to permit access to the mechanism. A chamber 3 is mounted on top of the casing and this chamber is connected with a pipe 4 which may lead to the system or apparatus to be controlled, such as a main line in which either volume or pressure is to be controlled, a room or enclosure in which the temperature is to be controlled, or the like. For the purpose of illustration I will assume a situation in which pipe 4 leads to an enclosure or apparatus in which the pressure is to be controlled. Within the chamber I provide a bellows 5 which will be forced downwardly by increase of pressure in the pipe 4 and in the space within the chamber surrounding the bellows. A stud 6 is mounted in the bellows and is provided with a reduced lower portion 7 extending through an opening in the top of the casing. The lower end of the stud is pointed as at 8. Shoulder 9, formed at the junction of the main body portion of the stud and the reduced lower end, limits the downward movement of the stud by engagement with the top of the casing.

Within the casing I provide a lever 10 mounted on pivots 11 on the inside of the top of the casing. Intermediate the ends of the lever I provide an adjustable screw 12 passing through a threaded opening in the lever and having a depression to receive the pointed end of the stud. The screw may be held in adjusted position by a nut. Adjacent the other end of the lever I provide a stop screw 13 to limit its upward movement. Upward pressure is exerted on the lever by a follower 14 having a pin 15 projecting from it and passing through an opening 16 in the lever. Adjacent the lower end of the pin 15, the follower is provided with a substantially ball-like surface to permit the follower to contact with the bottom of the opening 16 regardless of the angular position of the lever. The follower 14 is urged upwardly by a spring 18, the lower end of which is engaged by a follower 19 mounted in a yoke 20. A threaded rod 21 passes through the yoke to engage the lower follower and is provided with a handle 22 on its lower end. The compression of the spring, and thus the upward force exerted on lever 10, may be regulated by rod 21. A pin or other securing means (not shown) may be passed through the portion of the pin 15 above the lever 9 to permit the assembly or removal of the spring 18 without removing the follower 14.

The pilot member (see Fig. 2) comprises a block 23 having a horizontally arranged bore and an intersecting vertically arranged bore. It is arranged on one of the walls of the casing. The exposed end of the horizontal bore is of reduced cross section as indicated at 24 and is adapted to receive the tube 25 having a central bore 26. The end of this bore is reduced and is illustrated as a rectangular orifice 27. However, it may be of other shapes, such as oval, in which the major axis greatly exceeds the minor axis. Inwardly of the face of the member 23 the horizontal bore is enlarged as at 28 and the tubular member 25 is provided with a flange 29 which abuts the shoulder so formed to position the outer face and discharge orifice. Suitable packing and rings 30 are arranged in the bore beyond the flange. The parts are held assembled by a spring 31 and the end of the bore is closed by a threaded cap 32. The vertical bore 33 intersects the horizontal bore and a pipe 34 is connected to it. This pipe is in turn connected to the source of regulating air or gas (not shown) which is also delivered to the diaphragm chamber of the diaphragm valve (not shown). A disc 35 may be mounted on the tube 25 to facilitate rotation of the tube and the surface of the pilot member 23 may be provided with indicia 36 to indicate the adjusted position of the discharge orifice.

A wiping arm or lever is pivotally mounted in front of the discharge opening and is adapted to move over it with a wiping or shearing contact so as to close the discharge orifice when desired. The lever may be so adjusted that no excess friction will occur between it and the end of the tube 25. As shown, lever 44 is mounted on a pivot 38 (see Fig. 3) and this pivot is carried by a bracket 39 secured to the member 23. The bracket carries a leaf spring 40 which serves to resiliently support one end of the pivot member, the pivot member being provided with a reduced end 41 received in an opening in the member 40. The opposite end 42 of the pivot member is likewise provided with a reduced end and received in the end of a screw 43 passing through a threaded opening in the bracket to provide an adjustment of the pivot. The wiping lever 44 is mounted on the pivot and a spring 52 surrounds the pivot and engages the wiping lever to urge it in one direction. As shown, one end of the spring is extended as at 45 and engages the bracket 39 and the other end 46 is extended and engages the wiping lever 44.

The lever 44 is actuated from the lever 10 by a link connection. As shown, link 47 is connected to a crank portion 48 formed on the lever 44. On the under side of the lever 10 I provide a bracket 49. This bracket is provided with openings 50 and 51 whereby the link may be connected to lever 10 either in the position shown in Figs. 1, 4 and 5 of the drawings, or in the position shown in Figs. 6 and 7 of the drawings.

Figure 5:
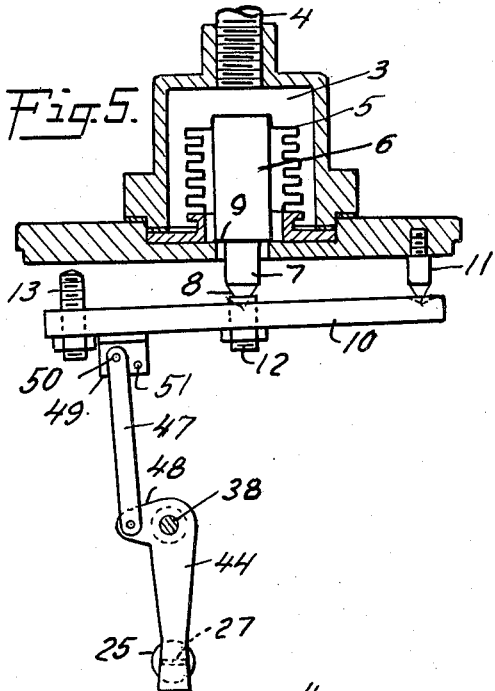
Fig. 5 is a similar view showing the discharge orifice closed.

The operation of the device will be better understood by reference to Figs. 4 to 7. In Figs. 4 and 5, the link 47 is shown connected to the bracket at the opening 50 and in this arrangement an increase in pressure in the pipe 4 is adapted to move the wiping lever 44 from the position shown in Fig. 4 with the discharge orifice 27 open to the position shown in Fig. 5 with the discharge orifice closed. As pressure builds up in the chamber 3, the bellows is forced downwardly until the shoulder 9 on the stud 6 engages the top of the casing as shown in Fig. 5. This downward movement is transmitted to lever 10 against the force of spring 18 causing the link 47 to move downwardly and move the wiping lever over the discharge orifice. Pressure then builds up in the control system and in the diaphragm chamber of the diaphragm valve (not shown) to open the valve.

Figure 6:
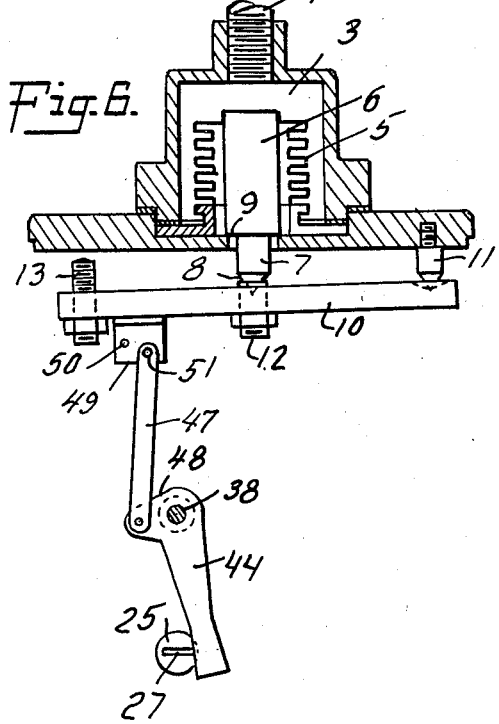
Fig. 6 is a similar view with the discharge orifice open and with the wiping arm connected to move to a closing position upon decrease in pressure in the system.
Figure 7:
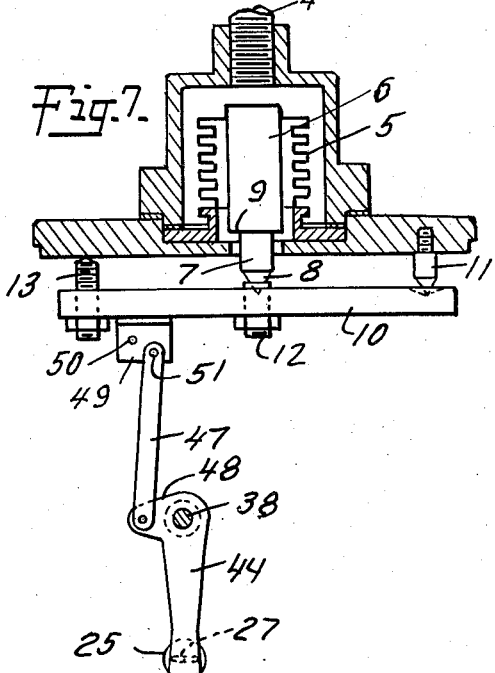
Fig. 7 is a similar view with the discharge orifice closed.

When the control is used to close the discharge orifice upon a decrease in pressure, the link 47 is connected to opening 51 in the bracket 49 moving the link downwardly and thus swinging the crank portion 48 of the wiping lever counterclockwise. With this connection and with pressure in the chamber 3, as indicated in Fig. 6, the discharge orifice is opened by the wiping lever 44 is arranged on the opposite side of the discharge orifice from that illustrated in Fig. 4. Under these conditions, upon a decrease in pressure in the pipe 4 and the chamber 3, the bellows expands tending to move away from the lever 10, but the lever 10 is forced upwardly by spring 18 until the stop screw 13 engages the top of the casing. As this occurs, the wiping lever moves in a clockwise direction around its pivot to close the discharge orifice.

As stated, the plane in which the wiping lever 44 oscillates can be regulated through the adjusting screw 43 to move the pivot toward or away from the face of the tubular member 25. The pressure of spring 18 may be adjusted by rod 21 and the path of travel of the wiping lever may be regulated by screw 12 and stop screw 13. The screw 12 should be adjusted to permit stud 6 to move downwardly a sufficient distance to bring the shoulder 9 into contact with the top of the casing and stop screw 13 should be adjusted to limit the movement of the wiping lever in a clockwise direction either to assume the position shown in Fig. 4 when the apparatus is connected to close the discharge orifice upon increase in pressure or to assume the position shown in Fig. 7 when the link 47 is connected to close the discharge orifice upon decrease in pressure.

It will be apparent that the sensitivity of the control may be regulated by rotating the tube 25 from the position shown in the drawings in which the major axis is arranged horizontally to a position at right angles thereto in which the major axis is arranged vertically or to an intermediate position. As shown, maximum movement of lever 44 is required to completely close the discharge opening whereas if the tube were rotated 90°, the wiping lever 44 would then only have to move an amount equal to the dimension of the minor axis of the discharge orifice to completely close it. It will also be apparent that while the invention has been described in connection with a pilot for a pressure control system, it may be used in connection with temperature control systems or in any system in which a control of this type is employed. The invention is also capable of use on valves of various types in which regulation of the sensitivity of the valve is desired.

I claim:

1. A valve structure comprising a rotatably mounted member having a central bore and having a centrally arranged discharge orifice at the end of the bore, and a pivoted lever mounted to move over the orifice to open and close it, the orifice having a major axis of greater dimension than its minor axis whereby sensitivity of the valve may be regulated by adjustment of the rotatably mounted member.

2. A valve structure comprising a rotatably mounted member having a central bore and having a centrally arranged rectangular discharge orifice at the end of the bore, and a pivoted lever mounted to move over the orifice to open and close it, the sensitivity of the valve being capable of adjustment by rotation of the member to change the angular position of the orifice.

3. In a pilot valve of the character described comprising a rotatably mounted member having a central bore and having a centrally arranged discharge orifice, a wiping lever mounted in front of the discharge orifice and adapted to move from a position covering the discharge orifice to a position uncovering the discharge orifice, a link connected to the wiping lever, a pivoted lever connected to the link, and control means to actuate the pivoted lever, the orifice having a major axis of greater dimension than its minor axis whereby sensitivity of the valve may be regulated by adjustment of the rotatably mounted member.

4. A pilot valve of the character described comprising a rotatably mounted member having a central bore and having a substantially centrally arranged rectangular discharge orifice at the end of the bore, a wiping lever pivotally mounted in front of the discharge orifice and adapted to move from a position covering the discharge orifice to a position uncovering the discharge orifice, a pivoted control lever to actuate the wiping lever, a connection between the pivoted control lever and the wiping lever, and control means to regulate the position of the pivoted control lever, the sensitivity of the valve being capable of adjustment by rotation of the member to change the angular position of the orifice.

5. A valve structure comprising a rotatably mounted member having a bore and having a discharge opening at the end of the bore, and a member mounted to move over the discharge orifice to open and close it, the orifice having a major axis of greater dimension than its minor axis whereby sensitivity of the valve may be regulated by adjustment of the rotatably mounted member.

STEN SODERBERG.

REFERENCES CITED

The following references are of record in the file of this patent:

UNITED STATES PATENTS

| Number | Name | Date |
|---|---|---|
| 1,953,406 | Hodgson | Apr. 3, 1934 |
| 2,235,651 | Slezak | Mar. 18, 1941 |
| 2,330,654 | Ziebolz | Sept. 28, 1943 |

FOREIGN PATENTS

| Number | Country | Date |
|---|---|---|
| 518,053 | Germany | Feb. 11, 1931 |
| 573,250 | Germany | Mar. 29, 1933 |